Patented Dec. 14, 1937

2,101,907

UNITED STATES PATENT OFFICE

2,101,907

METHOD OF MAKING RUBBER ARTICLES

Victor H. Hurt, Naugatuck, Conn., assignor to United States Rubber Products, Inc., New York, N. Y., a corporation of Delaware No Drawing. Application April 3, 1935, Serial No. 14,443

2 Claims. (Cl. 18—58)

This invention relates to the manufacture of rubber articles and more particularly to rubber articles deposited directly from latex on marked deposition surfaces to provide articles with raised or depressed designs in reverse of the depressed or relief portions of the deposition surfaces.

Various methods have been suggested for providing contrasting colors in the raised and depressed portions of rubber articles deposited from latex on marked deposition backings. In one method the depressed portions of the backing only are filled with latex of one color and thereafter the entire deposition backing treated with latex of a contrasting color, the second color forming a background for the local design of the first color. In another method latex of one color is applied to the entire backing but very thinly over the relief portions so that on application of a second layer of latex of a contrasting color, the color of the superposed second layer will be visible through the thinly deposited portions of the first layer and invisible through the thick portions of the first latex layer in the depressions of the deposition surface. In each of these cases latices of different colors are necessary to produce articles with surface markings having contrasting colors in the raised and depressed portions of the rubber film detached from the deposition backing.

The present invention relates to the production of contrasting colors in the raised and depressed portions of articles deposited directly from latex on marked deposition surfaces without the necessity for having latex compositions of more than one color.

According to the present invention, latex compounded as desired and of the desired color is applied to the marked deposition surface by a spraying, dipping, spreading or like operation, and the latex allowed to fill the depressed portions of the backing and cover the relief portions, the depth of the latex film at the relief portions, however, being less than at the depressed portions. A color contrasting with the color of the latex is then applied to the latex coating on the deposition backing so that the color will bleed through the latex layer to the relief portions of the backing without bleeding all the way through to the depressed portions of the backing. The color may be a water-soluble dye in an aqueous medium, or an oil-soluble dye dispersed with oil in an aqueous medium, or a suspension of pigment material in an aqueous or other liquid medium. Preferably the dye is dissolved or dispersed in a coagulant for the latex whereby on application of the coagulant there will be a simultaneous coagulation of the latex layer on the surface of the deposition backing and a bleeding through of the color material to the relief portions of the backing without bleeding through to the depressed portions thereof. An aqueous solution of acetic acid preferably 25%, is commonly used for coagulation of latex films on deposition backings and various colored dyes or pigments may be dissolved or dispersed directly in such a coagulant solution, with the aid of oil or other solvent for the coloring material if necessary for properly dispersing the same.

It is a relatively simple matter in practice to control the bleeding of the coloring material through the latex layer to the relief portions of the backing so that there will be no bleeding through to the depressed portions of the backing. No hard and fast rule can be laid down, however, since the time and depth of proper penetration or bleeding of the coloring matter depends on many factors. The amount or concentration of coloring material used will naturally depend on the thickness and concentration of the latex deposit, both at the relief portions and at the depressed portions of the backing, and on the contrast of its intensity with the intensity of color of the latex film. Unless there is some manner of coagulation of the latex film on the deposition backing before or during the application of the coloring material, the bleeding is somewhat more difficult to control. The control of the bleeding of the color is facilitated with latices of high viscosity, whether by virtue of high rubber content or high content of compound or thickening materials. If desired, the coagulation of the latex layer partially or substantially completely, may be made to take place immediately before application of the coloring material, as by treatment with an acid or other coagulant, or by applying heat sensitive latices to heated deposition backings. The latex layer should not be converted into a dried rubber film before application of the coloring material. It is preferred to simultaneously coagulate the latex layer and apply the contrasting color as by dissolving or dispersing the coloring material directly into the coagulant, which, in a similar manner to the latex layer, may be applied to the backing by spraying, spreading, dipping or like operations. Spraying the latex onto the backing and then spraying a 25% acetic acid solution containing the desired coloring material has been found very satisfactory. The rubber article after coagulation, and preferably after drying on the deposition backing may be removed and vulcanized, or it may be vulcanized on the backing prior to removal therefrom. If desired, the color may be applied to the wet latex layer by means of a second latex composition containing the desired coloring material. The second latex layer containing the contrasting color may be applied to the first latex layer after coagulation of the first layer by means of a coagulant, or it may be applied directly over the first wet latex layer and the two latices coagulated at the same time by means of a chemical coagulant applied to the second latex layer.

The deposition backing, of course, may be of any desired material with surface markings made by engraving, etching, molding, or other operations. It may be made of metal, wood, clay, rubber, glass, synthetic resins or other materials and may be of any desired shape such as in sheet form, or in the form of a part or whole of a shaped article, such as a bathing cap, shoe upper, or the like. The term "latex" in the description and the claims is intended to designate broadly coagulable dispersions of latex materials, including artificial dispersions of rubber or rubber-like materials as well as natural latex which may be preserved or compounded or otherwise treated as desired and which may be in a normal, diluted, concentrated or purified condition produced by methods well known in the art.

Various other modifications will occur to those skilled in the art and it is not intended to limit the invention other than as set forth in the appended claims.

Having thus described my invention, what I claim and desire to protect by Letters Patent is:

1. In the manufacture of a rubber article with raised and depressed markings on the surface thereof by the deposition of a rubber film from latex on a deposition backing having a deposition surface with depressed and relief portions, the steps which comprise applying latex to the deposition surface to fill in the depressions and cover the relief portions of said surface, and applying to the exposed surface of the deposited latex layer and before drying thereof a color in an aqueous medium contrasting with the color of the latex so that the contrasting color will bleed through the latex layer to the relief portions of the backing without bleeding through to the depressed portions of the backing and there will be provided in the marked surface of the rubber film a color in the depressed portions contrasting with the color of the raised portions thereof.

2. In the manufacture of a rubber article with raised and depressed markings on the surface thereof by the deposition of a rubber film from latex on a deposition backing having a deposition surface with depressed and relief portions, the steps which comprise applying latex to the deposition surface to fill in the depressions and cover the relief portions of said surface, and applying to the exposed surface of the deposited latex layer and before drying thereof a latex coagulant containing a color contrasting with the color of the latex whereby the contrasting color will bleed through the deposit to the relief portions of the backing without bleeding through to the depressed portions of the backing and there will be provided in the marked surface of the rubber film a color in the depressed portions contrasting with the color of the raised portions thereof.

VICTOR H. HURT.